US008728973B2

(12) United States Patent
Hashimoto et al.

(10) Patent No.: US 8,728,973 B2
(45) Date of Patent: May 20, 2014

(54) PHOTOCATALYTIC MATERIALS AND PROCESS FOR PRODUCING THE SAME

(75) Inventors: Kazuhito Hashimoto, Tokyo (JP); Hiroshi Irie, Yamanashi (JP); Huogen Yu, Hubei (CN); Yasushi Kuroda, Toyama (JP); Yasuhiro Hosogi, Toyama (JP)

(73) Assignees: The University of Tokyo, Tokyo (JP); Showa Denko K.K., Tokyo (JP)

( * ) Notice: Subject to any disclaimer, the term of this patent is extended or adjusted under 35 U.S.C. 154(b) by 74 days.

(21) Appl. No.: 13/259,131

(22) PCT Filed: Jul. 29, 2010

(86) PCT No.: PCT/JP2010/063231
§ 371 (c)(1),
(2), (4) Date: Feb. 9, 2012

(87) PCT Pub. No.: WO2011/013850
PCT Pub. Date: Feb. 3, 2011

(65) Prior Publication Data
US 2012/0135861 A1    May 31, 2012

(30) Foreign Application Priority Data
Jul. 30, 2009   (JP) ................. 2009-177613

(51) Int. Cl.
*B01J 23/00*    (2006.01)
*B01J 23/72*    (2006.01)
*B01J 23/56*    (2006.01)
*B01J 23/70*    (2006.01)
*B01J 23/08*    (2006.01)
*C01G 23/047*   (2006.01)

(52) U.S. Cl.
USPC ........... 502/309; 502/323; 502/331; 502/332; 502/346; 502/351; 502/355; 423/610

(58) Field of Classification Search
USPC ......... 502/309, 313, 314, 316, 318, 323, 327, 502/331, 332, 336, 338, 345, 346, 350, 355, 502/351; 423/610; 204/157.15
See application file for complete search history.

(56) References Cited

U.S. PATENT DOCUMENTS 4,085,193 A    4/1978  Nakajima et al.
4,916,107 A    4/1990  Brand et al.
(Continued)

FOREIGN PATENT DOCUMENTS

| CN | 1448214 A | 10/2003 |
| CN | 1613555 A | 5/2005 |
| CN | 1668778 A | 9/2005 |
| CN | 101733090 A | 6/2010 |
| EP | 0317875 A2 | 5/1989 |
| JP | 2009178636 A * | 8/2009 |

OTHER PUBLICATIONS

Hua Tian, et al.; Photocatalytic degradation of methyl orange with W-doped $TiO_2$ synthesized by a hydrothermal method; Materials Chemistry and Physics; vol. 112, No. 1, Nov. 15, 2008; pp. 47-51; XP-002606276.

(Continued)

*Primary Examiner* — Anthony J Zimmer
(74) *Attorney, Agent, or Firm* — Sughrue Mion, PLLC

(57) ABSTRACT

The present invention relates to a photocatalytic material having a visible light activity which includes a tungsten-doped titanium oxide or a tungsten/gallium-codoped titanium oxide, and a divalent copper salt and/or a trivalent iron salt supported on a surface of the doped or codoped titanium oxide, and a process for producing the photocatalytic material.

15 Claims, 1 Drawing Sheet

(56) References Cited

U.S. PATENT DOCUMENTS 5,759,948 A * 6/1998 Takaoka et al. ............... 502/325
6,124,232 A 9/2000 Chang et al.
6,306,796 B1 * 10/2001 Suzue et al. ................... 502/350
2005/0191505 A1 9/2005 Akarsu et al.

OTHER PUBLICATIONS

A. Di Paola et al; "Preparation of Polycrystalline TiO2 Photocatalyst Impregnated with Various Transition Metal Ions: Characterization and Photocatalytic Activity for the Degradation of 4-Nitrophenol"; J. Phys. Chem. B 2002; vol. 106; pp. 637-645.

Chinese Office Action dated Aug. 12, 2013 issued by Chinese Patent Office in corresponding Chinese Patent Application No. 201080025567.4.

Ya-An Cao, et al.; "Effect of Sn-doping on Photocatalytic Activity of $TiO_2$ Film for Degradation of Phenol"; Journal of Chinese Universities; vol. 22, No. 11; Nov. 2001; pp. 1910-1912, Abstract (at p. 1912).

Teruhisa Ohno, et al.; "Photocatalytic oxidation of water by visible light using ruthenium-doped titanium dioxide powder"; Journal of Photochemistry and Photobiology A: Chemistry; vol. 127 (1999); pp. 107-110.

Jinlong Zhang, et al.; "Photocatalysis"; East China University of Science and Technology Press; 1st Edition; Oct. 2004; pp. 67-69 and 76-82.

* cited by examiner

US 8,728,973 B2

PHOTOCATALYTIC MATERIALS AND PROCESS FOR PRODUCING THE SAME

CROSS REFERENCE TO RELATED APPLICATIONS

This application is a National Stage of International Application No. PCT/JP2010/063231 filed Jul. 29, 2010, claiming priority based on Japanese Patent Application No. 2009-177613 filed Jul. 30, 2009, the contents of all of which are incorporated herein by reference in their entirety.

TECHNICAL FIELD

The present invention relates to photocatalytic materials having a visible light activity, and also relates to a process for producing the photocatalytic materials.

BACKGROUND ART

Photocatalytic materials exhibit an activity of oxidizing and decomposing not only organic substances but also some of inorganic substances such as nitrogen oxides by utilizing a light that is available at low costs and has a very small burden on environments, as an energy source thereof. With the recent tendency that the photocatalytic materials are used in more extensive application fields such as environmental purification, deodorization, anti-fouling and sterilization, a variety of photocatalytic materials have been developed and researched. In particular, there is a demand for photocatalytic materials capable of exhibiting their activity under irradiation of a visible light, and various researches and developments therefor have now proceeded.

In recent years, it has now been attempted to develop visible light-responsive photocatalytic materials containing tungsten oxide as a base component. However, owing to a poor alkali resistance of tungsten oxide, there is a further demand for titanium oxide-based materials having a higher flexibility.

Many researches have been hitherto made to impart a good visible light responsibility to titanium oxide by adding a metal ion component thereto. For example, Patent Document 1 discloses a visible light-responsive photocatalytic material which is obtained by allowing a transition metal component to coexist when subjecting titanium sulfate or titanium oxysulfate to hydrolysis to synthesize titanium oxide. However, in Patent Document 1, among many transition metal components exemplified in its specification, only Fe was practically used in Examples embodying the invention of Patent Document 1, and the effects of the other transition metal components are not described therein, and are therefore uncertain.

Patent Document 2 discloses a W-containing titanium oxide having a visible light responsive characteristic. However, as far as the Examples described in Patent Document 2 are concerned, the titanium oxides obtained therein have a low crystallinity and the effects of addition of W are uncertain. In addition, in Patent Document 2, only in view of the results of the ammonia elimination experiment, it is described that the W-containing titanium oxide has an activity for decomposing organic substances. However, the ground therefor is unclear and unsatisfactory to attain such a conclusion. Further, in the Examples of Patent Document 2, a fluorescent lamp which emits a light including an ultraviolet light component was used as a light source. Therefore, only from the results of the Examples of Patent Document 2, it is not possible to confirm whether or not the photocatalyst obtained therein have an activity of decomposing organic substances under irradiation of a visible light.

PRIOR DOCUMENTS

Patent Document 1: JP-A 2002-60221
Patent Document 2: JP 4250332

DISCLOSURE OF THE INVENTION

Problems to be Solved by the Invention

In view of the above problems encountered in the art, an object of the present invention is to provide a titanium oxide-based catalytic material having a high oxidative decomposition activity under irradiation of a visible light and a process for producing the catalytic material.

Means for Solving the Problems

As the result of various extensive researches concerning titanium oxide capable of exhibiting a high oxidative decomposition activity under irradiation of a visible light, the present inventors have found that when a metal ion which is expected to exhibit an effect of shifting a lower end potential of a conduction band of titanium oxide to a positive potential side, or a metal ion which is expected to exhibit an effect of forming an isolated level on a positive potential side of a lower end potential of a conduction band of titanium oxide, is doped into the titanium oxide, it is possible to produce a titanium oxide-based material capable of absorbing a visible light, and further when a multi-electron reduction catalyst for oxygen is supported on the surface of the titanium oxide-based material, it is possible to successfully develop a photocatalytic material capable of exhibiting a photocatalytic effect under irradiation of a visible light.

Also, as a result of further intensive researches for obtaining a visible light-responsive photocatalytic material having a higher oxidative decomposition activity by improving the techniques on the basis of the above finding, it has been found that tungsten is a suitable dopant for the titanium oxide, and copper and iron are suitable as a multi-electron reduction catalyst component to be combined with the dopant. The present invention has been accomplished on the basis of the above findings.

In addition, it has been found that a metal ion component including tungsten can be effectively doped into titanium oxide by any of the method in which the doping is conducted upon synthesizing the titanium oxide by hydrolysis in an aqueous solution, the method in which the doping is conducted upon synthesizing the titanium oxide by a vapor phase method, and the method in which the doping is conducted by supporting the metal ion component on a titanium oxide powder and then heat-treating the resulting material.

Thus, the present invention relates to the following aspects:
[1] A photocatalytic material having a visible light activity, including a tungsten-doped titanium oxide or a tungsten/gallium-codoped titanium oxide; and a divalent copper salt and/or a trivalent iron salt supported on a surface of the doped or codoped titanium oxide.
[2] The photocatalytic material as described in the above aspect [1], wherein a molar ratio of tungsten to titanium (W:Ti) in the tungsten-doped titanium oxide is in the range of from 0.01:1 to 0.1:1.
[3] The photocatalytic material as described in the above aspect [1], wherein a molar ratio of tungsten to titanium (W:Ti) in the tungsten/gallium-codoped titanium oxide is in the range of from 0.01:1 to 0.1:1, and a molar ratio of tungsten to gallium (W:Ga) in the tungsten/gallium-codoped titanium oxide is in the range of from 1:1.5 to 1:2.5.

[4] The photocatalytic material as described in any one of the above aspects [1] to [3], wherein the titanium oxide contains a crystal structure of a rutile type in an amount of 50% or more.

[5] The photocatalytic material as described in any one of the above aspects [1] to [3], wherein the titanium oxide contains a crystal structure of an anatase type in an amount of 50% or more.

[6] The photocatalytic material as described in any one of the above aspects [1] to [3], wherein the titanium oxide contains a crystal structure of a brookite type in an amount of 50% or more.

[7] A process for producing the photocatalytic material as described in any one of the above aspects [1] to [6], successively including:
a doping step: drying and solidifying a mixed solution containing a hexavalent tungsten salt and a tetravalent titanium salt or a mixed solution containing a hexavalent tungsten salt, a tetravalent titanium salt and a trivalent gallium salt and then calcining the resulting dried solid at a temperature of from 600 to 1200° C. to obtain a tungsten-doped titanium oxide or a tungsten/gallium-codoped titanium oxide; and
a metal salt supporting step: supporting a divalent copper salt and/or a trivalent iron salt on the doped or codoped titanium oxide.

[8] A process for producing the photocatalytic material as described in any one of the above aspects [1] to [6], successively including:
a doping step: mixing an aqueous solution which contains a hexavalent tungsten salt only or contains a hexavalent tungsten salt and a trivalent gallium salt and is heated to a temperature of 60° C. or higher, with a solution containing a tetravalent titanium salt to obtain a tungsten-doped titanium oxide or a tungsten/gallium-codoped titanium oxide; and
a metal salt supporting step: supporting a divalent copper salt and/or a trivalent iron salt on the doped or codoped titanium oxide.

[9] The process as described in the above aspect [8], wherein the solution containing the tetravalent titanium salt is an aqueous solution of titanium tetrachloride.

[10] A process for producing the photocatalytic material as described in any one of the above aspects [1] to [6], successively including:
a doping step; mixing a gas containing a vapor of a volatile titanium compound and a vapor of a volatile tungsten compound or a gas containing a vapor of a volatile titanium compound, a vapor of a volatile tungsten compound and a vapor of a volatile gallium compound, with a gas containing an oxidative gas to obtain a tungsten-doped titanium oxide or a tungsten/gallium-codoped titanium oxide; and
a metal salt supporting step; supporting a divalent copper salt and/or a trivalent iron salt on the doped or codoped titanium oxide.

[11] The process as described in the above aspect [10], wherein the volatile titanium compound is titanium tetrachloride.

[12] A process for producing the photocatalytic material as described in any one of the above aspects [1] to [6], successively including:
a doping step: supporting a hexavalent tungsten salt or both of a hexavalent tungsten salt and a trivalent gallium salt on a titanium oxide powder and then calcining the resulting material at a temperature of from 800 to 1000° C. to obtain a tungsten-doped titanium oxide or a tungsten/gallium-codoped titanium oxide; and
a metal salt supporting step; supporting a divalent copper salt and/or a trivalent iron salt on the doped or codoped titanium oxide.

[13] The process as described in any one of the above aspects [7] to [12], wherein in the metal salt supporting step, the tungsten-doped titanium oxide or the tungsten/gallium-codoped titanium oxide is contacted with an aqueous solution containing the divalent copper salt and/or the trivalent iron salt and the obtained mixture is heated to a temperature of from 85 to 100° C.

Effect of the Invention

In accordance with the present invention, there are provided a titanium oxide-based photocatalytic material having a high oxidative decomposition activity under irradiation of a visible light, and a process for producing the photocatalytic material.

BEST MODE FOR CARRYING OUT THE INVENTION

[Photocatalytic Material]

Figure 1:
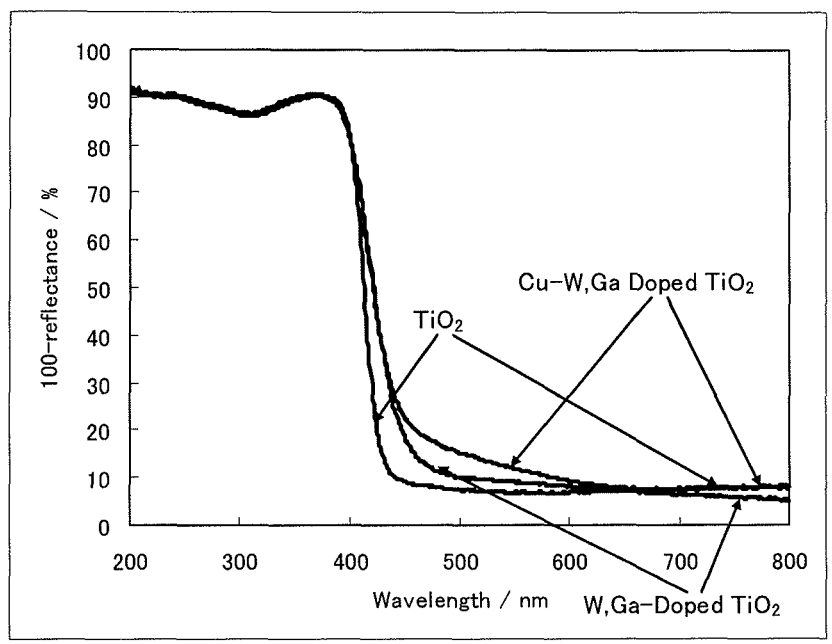
FIG. 1 is a view showing ultraviolet/visible diffuse reflectance spectra of the respective samples obtained in Example 1.

The photocatalytic material of the present invention includes a tungsten-doped titanium oxide prepared by doping tungsten into titanium oxide (hereinafter occasionally referred to merely as a "W-doped titanium oxide") or a tungsten/gallium-codoped titanium oxide prepared by codoping both of tungsten and gallium into titanium oxide (hereinafter occasionally referred to merely as a "W/Ga-codoped titanium oxide"), and a divalent copper salt (hereinafter occasionally referred to as a "copper divalent salt") and/or a trivalent iron salt (hereinafter occasionally referred to as an "iron trivalent salt") supported on a surface of the doped or codoped titanium oxide, and has a visible light activity.

The term "having a visible light activity" as used herein means that the photocatalytic material is capable of absorbing a larger amount of a light having any wavelength in a wavelength region of a visible light irradiated than that absorbed by titanium oxide by itself (for example, titanium oxide of an anatase type) so that oxidative decomposition reaction of organic substances can be further promoted as compared to the case where the titanium oxide is used.

In the present invention, as described above, tungsten is used as a dopant for titanium oxide. The reasons why the use of tungsten is suitable are considered as follows.

One reason therefor resides in that the tungsten doped into titanium oxide acts to shift a lower end potential of a conduction band formed in the titanium oxide toward a positive potential side thereof to an adequate extent. The above shifting action due to the tungsten doped may be suggested by calculating a state density of an inside of a semiconductor, for example, according to the method described in the conventionally known literature (K. Obata et al., "Chemical Physics". Vol. 339, pp. 124-132, 2007).

Another reason therefor resides in that an ionic radius of tungsten (VI) of 0.58 Å is very close to an ionic radius of titanium (IV) of 0.61 Å so that substitution of tungsten (VI) for a site of titanium (IV) in the crystal tends to readily occur.

As far as these conditions are concerned, it will be expected that some metals other than tungsten can exhibit the similar effects. However, among these metals, tungsten is especially preferred as a dopant for titanium oxide although the reason therefor is not clearly determined at the present time. The reason why tungsten acts as a suitable dopant for titanium oxide is suggested, for example, such that transfer of electrons in tungsten into the copper divalent salt as a multi-electron reduction catalyst for oxygen or the iron trivalent salt which are supported on the surface of titanium oxide tends to be smoothly carried out, or substitution of tungsten for a site of titanium is likely to occur.

The shape or configuration of the titanium oxide used in the present invention is not particularly limited. In the present invention, there may be used titanium oxide in the form of fine particles, thin film-like titanium oxide or the like. The photocatalytic reaction proceeds in a more advantageous manner as the specific surface area of a photocatalyst used therein increases. Therefore, it is especially preferred that the titanium oxide be in the form of fine particles. The crystal structure of the titanium oxide is not particularly limited, and may be any of a rutile type, an anatase type and a brookite type, etc.

The titanium oxide composed mainly of a rutile type titanium oxide preferably contains the crystal structure of a rutile type in an amount of 50% or more, and more preferably 65% or more. Also, the titanium oxide composed mainly of an anatase type titanium oxide or a brookite type titanium oxide preferably contains the crystal structure of an anatase type or a brookite type in an amount of 50% or more, and more preferably 65% or more.

The proportions of the respective crystal structures may be determined from X-ray diffraction peak intensity values attributed to the respective type titanium oxides. For example, in order to obtain the proportion of the titanium oxide composed mainly of a rutile type titanium oxide, the ratio of a peak intensity attributed to the rutile type crystal structure to a sum of peak intensities attributed to the crystal structures of the various titanium oxides may be determined.

In the present invention, the amount of tungsten to be doped is preferably adjusted such that a molar ratio of tungsten to titanium (W:Ti) is in the range of from 0.01:1 to 0.1:1. When the molar ratio W:Ti is 0.01:1 or larger, the tungsten doped serves for sufficiently increasing an amount of a visible light absorbed therein. When the molar ratio W:Ti is 0.1:1 or smaller, it is possible to suppress occurrence of defects in crystals of titanium oxide as well as occurrence of recombination between electrons and holes caused by the light absorption while increasing the amount of a visible light absorbed, so that the resulting photocatalyst can exhibit a good catalytic efficiency. As is apparent from the above description, an optimum value of the molar ratio W:Ti is determined from such a well-balanced condition in which the increase in number of defects in crystals of the titanium oxide is suppressed while increasing an amount of a visible light absorbed therein due to the tungsten doped. The molar ratio W:Ti is more preferably in the range of from 0.01:1 to 0.05:1 and still more preferably from 0.02:1 to 0.04:1.

As the dopant used in the present invention, tungsten only may be doped into titanium oxide (to obtain a W-doped titanium oxide). However, it is preferred that both tungsten and gallium be codoped into the titanium oxide.

In production of the W-doped titanium oxide, a tungsten (VI) ion is substituted for a site of a titanium (IV) ion in titanium oxide so that positive charges therein become excess. Therefore, it is expected that balancing between the excess positive charges and electrons takes place which results in production of tungsten (V) or tungsten (IV) or occurrence of defective oxygen. In addition, it is expected that these structural defects which are deviated from an estimated inherent band structure tend to cause lack of the amount of light absorbed therein or recombination of electrons and holes generated due to excitation by irradiation of light, so that the W-doped titanium oxide tends to be deteriorated in photocatalytic activity.

Under this circumstance, if a gallium (III) ion exists together with the tungsten ion, it is expected that the above balance between positive charges and electrons is adequately maintained. In addition, since an ionic radius of gallium (III) which is 0.62 Å is close to an ionic radius of titanium (IV) which is 0.61 Å. Therefore, it is preferred that gallium and tungsten be codoped into titanium oxide. When being codoped, the amount of gallium added is ideally adjusted in view of the above well-balanced electric charges such that the molar ratio of tungsten to gallium (W:Ga) in the codoped titanium oxide is 1:2. Thus, the molar ratio of tungsten to gallium (molar ratio W:Ga) is preferably as close to 1:2 as possible, at least lies within the range of from 1:1.5 to 1:2.5, more preferably from 1:1.7 to 1:2.3 and still more preferably from 1:1.8 to 1:2.2.

The copper divalent salt and the iron trivalent salt supported on the doped or codoped titanium oxide are expected to act as a multi-electron reduction catalyst for oxygen and therefore promote a smooth transfer of electrons as described previously. Thus, it is suggested that these salts contribute to improvement in oxidative decomposition activity of the catalyst under irradiation of a visible light. The amount of each of the copper divalent salt and the iron trivalent salt supported is preferably from 0.0001 to 1% by mass and more preferably from 0.01 to 0.3% by mass on the basis of the photocatalytic material.

Among these salts, the copper divalent salt is preferred from the viewpoint of imparting a good antimicrobial property to the resulting catalyst even when used in a dark place, whereas the iron trivalent salt is preferred from the viewpoint of a good safety (harmlessness) of the material.

The copper divalent salt and the iron trivalent salt may include not only precursors thereof but also various modified forms such as oxidized products or decomposed products obtained at the stage of supporting these salts on the doped or codoped titanium oxide.

The particle size of the photocatalytic material is preferably from 0.005 to 1.0 μm and more preferably from 0.01 to 0.3 μm in view of a high activity and easiness in handling thereof. Meanwhile, the particle size may be adjusted by sieve classification, etc.

[Process for Producing Photocatalytic Material]

The process for producing the photocatalytic material according to the present invention successively includes a doping step of obtaining a W-doped titanium oxide or a W/Ga-codoped titanium oxide, and a metal salt supporting step of supporting a divalent copper salt and/or a trivalent iron salt on the thus obtained doped or codoped titanium oxide. In the following, the respective steps are explained.

(1) Doping Step:

In the doping step, the method of producing the W-doped titanium oxide or the W/Ga-codoped titanium oxide is not particularly limited. However, the present inventors have confirmed that at least the following four methods (first to fourth methods) are effective to produce the doped or codoped titanium oxide.

(First Method)

The first method is a production method in which the W-doped titanium oxide or the W/Ga-codoped titanium oxide is produced by a so-called sol-gel method.

Upon synthesis of the W-doped titanium oxide, a solution containing a hexavalent tungsten salt (hereinafter occasionally referred to as a "tungsten hexavalent salt") and a tetravalent titanium salt (hereinafter occasionally referred to as a "titanium tetravalent salt") is mixed and stirred, and then heated or placed under reduced pressure to remove a solvent therefrom by evaporation, thereby obtaining a solid. The resulting solid is then calcined to obtain the W-doped titanium oxide.

Upon synthesis of the W/Ga-codoped titanium oxide, the same procedure as described above for synthesis of the W-doped titanium oxide may be carried out except for using a mixed solution containing the tungsten hexavalent salt, the titanium tetravalent salt and a trivalent gallium salt (hereinafter occasionally referred to as a "gallium trivalent salt") as the staring material.

The solvent used in the first method is not particularly limited. Examples of the solvent suitably used in the first method include water, alcohols, ketones and mixtures thereof. Specific examples of the alcohols include methanol, ethanol, 1-propanol, 2-propanol, 1-butanol and mixed solutions thereof. Specific examples of the ketones include acetone, acetyl acetone, methyl ethyl ketone and mixed solutions thereof. Among these solvents, a mixed solvent containing two kinds of solvents selected from the group consisting of methanol, ethanol, 1-propanol and acetyl acetone is preferred, and a mixed solvent containing ethanol and acetyl acetone is more preferred.

The heating temperature used upon removing the solvent by evaporation is preferably from 50 to 150° C. and more preferably from 70 to 120° C. The reduced pressure used in the first method is preferably from 100 to 5000 Pa and more preferably from 500 to 3500 Pa.

Also, the temperature used upon the calcination is preferably from 600 to 1200° C. and more preferably from 900 to 1000° C. The calcination temperature and the calcination atmosphere are preferably appropriately adjusted according to requirements.

The tungsten hexavalent salt is not particularly limited. Examples of the tungsten hexavalent salt include tungsten hexachloride, tungsten dichloride dioxide, tungsten hexafluoride, tungsten hexacarbonyl, tungsten tetrachloride monoxide, tungstic acid, ammonium meta-tungstate, ammonium para-tungstate, lithium tungstate, sodium tungstate, potassium tungstate, magnesium tungstate and calcium tungstate.

The gallium trivalent salt used in the first method is not particularly limited. Examples of the gallium trivalent salt include gallium trichloride, gallium tribromide, gallium (III) acetylacetonate, gallium trifluoride, gallium trifluoride trihydrate, gallium triiodide, gallium nitrate, gallium perchlorate, gallium perchlorate hydrate, gallium sulfate and gallium sulfate hydrate.

Examples of the titanium tetravalent salt include titanium tetrachloride, an aqueous solution of titanium tetrachloride, titanium tetrabromide, tetrabutoxy titanium, tetra-tert-butoxy titanium, tetraethoxy titanium, titanium tetrafluoride, titanium tetraiodide, tetraisopropoxy titanium, tetramethoxy titanium, titanium (IV) nitrate and tetrapropoxy titanium. Among these titanium tetravalent salts, preferred are an aqueous solution of titanium tetrachloride, titanium tetrachloride and tetraisopropoxy titanium, and more preferred are an aqueous solution of titanium tetrachloride and tetraisopropoxy titanium, because of a good availability, inexpensiveness, a high purity, easiness of handling and high solubility in alcohols.

(Second Method)

The second method is a method in which a dopant solution heated to a predetermined temperature is mixed with a solution containing a tetravalent titanium salt to produce the W-doped titanium oxide or the W/Ga-codoped titanium oxide.

More specifically, upon synthesis of the W-doped titanium oxide, an aqueous solution containing a tungsten hexavalent salt is previously heated to a temperature of 60° C. or higher, and then mixed with the tetravalent titanium salt-containing solution to obtain the W-doped titanium oxide. When previously heating the aqueous solution to a temperature of 60° C. or higher, it is possible to conduct the reaction with a practical reaction rate. The aqueous solution is preferably heated to a temperature of from 60 to 105° C.

After completion of the mixing, the resulting mixed solution is preferably heated to a temperature of 95° C. or higher and maintained at that temperature for a period of 30 min or longer. Further, in this case, the mixed solution is preferably stirred. As a result, a slurry containing the W-doped titanium oxide is obtained. The slurry tends to contain unnecessary ion components generated in the reaction. The ion components are preferably removed by known methods, for example, cleaning of solids by decantation or filtration under reduced pressure, ultrafiltration, electrodialysis, ion exchange, etc. The thus obtained reaction product from which the unnecessary ion components have been removed is dried to obtain the W-doped titanium oxide.

Upon synthesis of the W/Ga-codoped titanium oxide, the same procedure as described above for synthesis of the W-doped titanium oxide may be carried out except for allowing the tungsten hexavalent salt and the gallium trivalent salt to coexist in the initial aqueous solution.

The tungsten hexavalent salt and the gallium trivalent salt usable in the second method may be the same as those exemplified in the first method.

Examples of the titanium tetravalent salt used in the second method include titanium tetrachloride, an aqueous solution of titanium tetrachloride, titanium tetrabromide, tetrabutoxy titanium, tetra-tert-butoxy titanium, tetraethoxy titanium, titanium tetrafluoride, titanium tetraiodide, tetraisopropoxy titanium, tetramethoxy titanium, titanium (IV) nitrate and tetrapropoxy titanium. Among these titanium tetravalent salts, preferred are an aqueous solution of titanium tetrachloride, titanium tetrachloride and tetraisopropoxy titanium, and more preferred is an aqueous solution of titanium tetrachloride, because of a good availability, inexpensiveness, a high purity and easiness of handling.

It is known that according to the second method, titanium oxide containing an anatase-type titanium oxide as a main component (in an amount of 50% or more) or titanium oxide containing a rutile-type titanium oxide as a main component (in an amount of 50% or more) is produced. As described in JP 3524342, it is also possible to obtain titanium oxide containing a brookite-type titanium oxide as a main component (in an amount of 50% or more). The crystal structure of the W-doped titanium oxide or the W/Ga-codoped titanium oxide produced according to the present invention is not particularly limited.

(Third Method)

The third method is a synthesis method using a so-called vapor phase method. More specifically, in the third method, a gas containing a vapor of a volatile titanium compound and a vapor of a volatile tungsten compound, or a gas containing a vapor of a volatile titanium compound, a vapor of a volatile tungsten compound and a vapor of a volatile gallium compound, is mixed with a gas containing an oxidative gas to obtain the W-doped titanium oxide or the W/Ga-codoped titanium oxide.

The volatile titanium compound used in the third method is not particularly limited. Examples of the volatile titanium compound include titanium tetrachloride, titanium tetrabromide, tetrabutoxy titanium, tetra-tert-butoxy titanium, tetraethoxy titanium, titanium tetrafluoride, titanium tetraiodide, tetraisopropoxy titanium, tetramethoxy titanium, titanium (IV) nitrate and tetrapropoxy titanium. Among these volatile titanium compounds, preferred are titanium tetrachloride and tetraisopropoxy titanium, and more preferred is titanium tetrachloride, because of a good availability, inexpensiveness and a high purity.

The volatile tungsten compound used in the third method is not particularly limited. Examples of the volatile tungsten compound include tungsten hexachloride, tungsten hexafluoride, tungsten hexacarbonyl and tungstic acid.

The volatile gallium compound used in the third method is not particularly limited. Examples of the volatile gallium compound include gallium trichloride, gallium tribromide, gallium (III) acetylacetonate, gallium trifluoride and gallium triiodide.

Examples of the oxidative gas include oxygen, ozone, nitrogen dioxide, water vapor and mixed gases thereof.

The temperature used upon mixing the gas containing a vapor of the volatile titanium compound with the gas containing the oxidative gas is preferably not lower than 700° C. but not higher than 1200° C. When the gases are mixed with each other at a temperature of 700° C. or higher, it is possible to conduct the reaction therebetween with a practical reaction rate. When the gases are mixed with each other at a temperature of 1200° C. or lower, the reaction therebetween can be carried out without using any expensive heating means.

(Fourth Method)

The fourth method is a method in which the tungsten hexavalent salt or both the tungsten hexavalent salt and the gallium trivalent salt are supported on a surface of a titanium oxide powder, and the resulting material is calcined at a temperature of from 800 to 1000° C. to obtain the W-doped titanium oxide or the W/Ga-codoped titanium oxide.

When the calcination temperature is lower than 800° C., the calcination tends to hardly proceed to a sufficient extent. When the calcination temperature is higher than 1000° C., the resulting calcined product tends to be undesirably agglomerated together. The calcination temperature is preferably from 800 to 1000° C. and more preferably from 900 to 980° C. The calcination temperature and the calcination atmosphere may be appropriately adjusted.

The titanium oxide powder used in the fourth method is not particularly limited, and may have any crystal structure of an anatase type, a rutile type and a brookite type. Further, the titanium oxide powder may also contain amorphous components. However, it should be noted that in the fourth method, since the titanium oxide powder on which the tungsten component or both the tungsten component and the gallium component have been supported is then calcined at a temperature of from 800 to 1000° C., the resulting calcined product has a crystal structure of a rutile type. It is advantageous that the photocatalytic material is in the form of fine particles and therefore has a large specific surface area. For this reason, the titanium oxide powder is also preferably in the form of fine particles.

The tungsten hexavalent salt and the gallium trivalent salt used in the fourth method are not particularly limited, and examples of these salts may be the same as those exemplified in the first method.

The above salts may be supported on the titanium oxide powder by ordinary methods. For example, there may be used the method in which after the tungsten hexavalent salt or both the tungsten hexavalent salt and the gallium trivalent salt are dissolved in a solvent such as water and an alcohol, the titanium oxide powder is added to the resulting solution to impregnate the powder with the solution containing the metal components, and then the resulting material is dried and solidified.

(2) Metal Salt Supporting Step:

In the metal salt supporting step, a copper divalent salt and/or an iron trivalent salt are supported on a surface of the W-doped titanium oxide or the W/Ga-codoped titanium oxide obtained by any of the above methods.

The copper divalent salt and/or the iron trivalent salt are preferably supported in the form of a very small cluster (i.e., in the form of highly dispersed fine particles) on the metal-doped titanium oxide. The reason therefor is suggested as follows although not clearly determined. That is, in order to obtain a structure capable of receiving excited electrons in its valence band which is suited for multi-electron reduction of oxygen, it is undesirable to form a large mass of copper element or iron element. Therefore, the metal salts are preferably supported in the form of an extremely small cluster on a surface layer of the metal-doped titanium oxide. For the purpose of obtaining such a material, the following method is preferred.

That is, there is preferably used such a method in which an aqueous solution containing the copper divalent salt and/or the iron trivalent salt is contacted with the W-doped titanium oxide or the W/Ga-codoped titanium oxide, and the resulting mixture is heated at a temperature of from 85 to 100° C. (preferably from 90 to 98° C.). In this method, only a copper ion or an iron ion adsorbed onto the surface of the titanium oxide in water is bonded thereto in the temperature range of from 85 to 100° C. Thereafter, the solid is recovered from the obtained mixture by any suitable method such as filtration and centrifugal separation, and then sufficiently washed with water. It has been found that sufficient removal of counter ions for copper or iron in the above water washing step is effective to obtain a visible light-responsive photocatalyst having a high activity. Due to the fact, it is suggested that the copper divalent salt and/or the iron trivalent salt on the surface of the titanium oxide are present together with a hydroxyl ion as a counter anion.

The copper divalent salt is not particularly limited. Examples of the copper divalent salt include copper (II) acetate, copper (II) acetylacetonate, copper (II) bromide, basic copper (II) carbonate, copper (II) chloride, copper (II) 2-ethyl hexanoate, copper (II) fluoride, copper (II) formate hydrate, copper (II) hydroxide, copper (II) iodide, copper (II) methoxide, copper (II) nitrate, copper (II) oxide, copper (II) phthalocyanine, cooper (II) pyrophosphate hydrate, copper (II) sulfate, copper (II) sulfate pentahydrate, copper (II) tetrafluoroborate, copper (II) trifluoroacetate hydrate, copper (II) trifluoroacetylacetonate and copper (II) trifluoromethane sulfonate. Among these copper divalent salts, preferred are copper (II) chloride, copper (II) nitrate and copper (II) sulfate pentahydrate, and more preferred is copper (II) chloride, because of a good availability and inexpensiveness.

The iron trivalent salt is not particularly limited. Examples of the iron trivalent salt include iron (III) acetylacetonate, iron (III) bromide, iron (III) chloride, iron (III) chloride hexahydrate, iron (III) ferrocyanide, iron (III) fluoride, iron fluoride trihydrate, iron (III) nitrate nonahydrate, iron (III) oxalate hexahydrate, iron (III) oxide, iron (III) perchlorate hydrate, iron (III) phosphate dihydrate, iron (III) phosphate tetrahydrate, iron (III) phthalocyanine chloride, iron (III) sulfate hydrate and iron (III) p-toluenesulfonate hexahydrate. Among these iron trivalent salts, preferred are iron (III) chloride, iron (III) chloride hexahydrate, iron (III) nitrate nonahydrate and iron (III) sulfate hydrate, and more preferred are iron (III) chloride and iron (III) chloride hexahydrate, because of a good availability and inexpensiveness.

The photocatalytic material of the present invention can also be subjected, if required, to various known treatments to make it usable either outdoors (for example, in the applications such as exterior materials, vehicles and materials for road construction) for the purposes of anti-fouling and environmental purification thereof (such as decomposition of $NO_x$), or indoors (for example, in the applications such as interior materials, furniture and domestic appliances) for the purposes of anti-fouling, deodorization and sterilization thereof.

The light sources used in the present invention are not particularly limited as long as they are capable of irradiating light including a visible light having a wavelength of from 380 to 780 nm (preferably from 400 to 530 nm). Examples of the light sources include solar radiation, a fluorescent lamp, a halogen lamp, a black light, a xenon lamp, a mercury lamp, LED and an organic EL. These light sources may also be appropriately fitted with an ultraviolet cut filter or an infrared cut filter.

EXAMPLES

The present invention will be described in more detail below with reference to the following examples. However, these examples are only illustrative and not intended to limit the invention thereto.

Example 1

Synthesis of W/Ga-Codoped Titanium Oxide

One gram of tungsten hexachloride ($WCl_6$; 99.9%; available from Aldrich) was dissolved in 10 mL of ethanol (99.5%; available from Wako Pure Chemical Industries, Ltd.) to prepare a tungsten solution.

One gram of gallium (III) nitrate hydrate ($Ga(NO_3)_3 \cdot xH_2O$; 99.9%; available from Aldrich) was dissolved in 10 mL of ethanol (same as used above) to prepare a gallium solution.

Two milliliters of acetyl acetone (min. 99.0%; available from Wako Pure Chemical Industries, Ltd.) and 15 mL of ethanol (same as used above) were mixed with each other, and while intimately stirring the resulting mixture, 5 mL of tetraisopropoxy titanium ($Ti[OCH(CH_3)_2]_4$; 99.999%; available from Aldrich) were added thereto. Further, the thus obtained mixture was intimately stirred to prepare a titanium solution.

A whole amount of the thus obtained titanium solution was mixed with 2.23 mL of the W solution and 2.88 mL of the Ga solution, and the resulting mixed solution was stirred for 30 min. The obtained solution was heated to 80° C. to evaporate the solvent therefrom, and dried and solidified to obtain a solid. The resulting solid was pulverized by an agate mortar and then calcined at 950° C. for 5 h, thereby obtaining a W/Ga-codoped titanium oxide. The composition of the thus obtained solid was $W_{0.03}Ga_{0.06}Ti_{0.91}O_2$ when calculated from the raw materials charged.

(Supporting of Copper Divalent Salt)

Ten grams of distilled water were added to 1 g of the thus obtained W/Ga-codoped titanium oxide. The resulting mixture was stirred and then mixed with 2.7 mg of copper (II) chloride dihydrate ($CuCl_2 \cdot 2H_2O$; >99.0%; available from Wako Pure Chemical Industries, Ltd.), and the resulting suspension was heated to 90° C. while stirring and maintained at that temperature for 1 h. The suspension was filtered to separate a solid therefrom, and the thus obtained solid was washed with distilled water and then dried in a dryer heated to 110° C., thereby obtaining a W/Ga-codoped titanium oxide on which the copper divalent salt was supported. As a result of subjecting the obtained product to an inductively coupled plasma emission spectrometric analysis (using "ICPS-7500" available from Shimadzu Seisakusho Corp.) to quantitatively determine Cu supported, it was confirmed that the amount of Cu supported on the titanium oxide was 0.03% by mass.

(Measurement of Ultraviolet/Visible Diffuse Reflectance Spectra)

FIG. 1 shows ultraviolet/visible diffuse reflectance spectra of the thus obtained W/Ga-codoped titanium oxide on which the copper divalent salt was supported. In addition, for reference, ultraviolet/visible diffuse reflectance spectra of the W/Ga-codoped titanium oxide before supporting the copper divalent salt thereon and titanium oxide itself are also shown in FIG. 1.

Meanwhile, in FIG. 1, the value calculated from the formula: "100-(reflectance obtained from the ultraviolet/visible diffuse reflectance spectra) (%)" which was plotted on an ordinate axis of the graph, represents the proportion of light absorbed. Also, the measurement of the ultraviolet/visible diffuse reflectance spectra was carried out using "UV-2450" and "ISR240A" (integrating sphere-equipped UV analyzer) both available from Shimadzu Seisakusho Corp.

As is apparent from FIG. 1, it was confirmed that the amount of light absorbed in a visible range was sequentially increased in the order of titanium oxide, the W/Ga-codoped titanium oxide and the copper divalent salt-supporting W/Ga-codoped titanium oxide (i.e., copper divalent salt-supporting W/Ga-codoped titanium oxide>W/Ga-codoped titanium oxide>titanium oxide).

(Evaluation of Photocatalytic Performance)

The photocatalytic activity of the thus obtained sample under irradiation of a visible light was examined by the following method. The reaction was evaluated by conducting a reaction for decomposition of isopropyl alcohol (hereinafter referred to merely as "IPA") in a vapor phase to quantitatively determine IPA, acetone and $CO_2$ under irradiation of a visible light.

First, 0.3 g of the sample to be evaluated was uniformly spread over an inside of a Petri dish having an inner diameter of 26.5 mm, and the Petri dish was placed within a 500 mL pyrex glass chamber, followed by hermetically closing the chamber. The interior atmosphere of the chamber was replaced with a synthetic air, and then the sample was irradiated with a whole light from a xenon lamp ("Luminar Ace LA-410UV-3" available from Hayashi Watch Works Co., Ltd.; light guide: "RLGB1-5L1000") to decompose residual organic substances on a surface of the sample to be evaluated. After confirming no occurrence of $CO_2$ from the residual organic substances, the interior atmosphere of the chamber was replaced again with a synthetic air.

On the other hand, dried nitrogen was passed through a reactant IPA gas to collect IPA vapor in a Tedlar bag. The IPA gas was introduced into the chamber such that the concentration of the IPA gas in the chamber was 300 ppm, and then allowed to stand in a dark place. The process in which the thus introduced IPA gas was adsorbed on the surface of the sample was observed for a period of 10 h or longer to confirm an adsorption equilibrium thereof. Thereafter, using a xenon lamp as a light source and an optical filter ("L-42", "B-47" and "C-40C" all available from Asahi Techno-Glass Co., Ltd.), light was irradiated from above the chamber while controlling a wavelength of light irradiated to 400 to 530 nm. The gas within the chamber was sampled at the predetermined time intervals upon irradiation of light, and subjected to quantitative determination of IPA as well as acetone and $CO_2$ as decomposed products using a hydrogen flame ionization gas chromatograph "GC-8A" available from Shimadzu Seisakusho Corp.

However, in this case, $CO_2$ was quantitatively determined via a methanizer "MT-N" available from Shimadzu Seisakusho Corp., in which $CO_2$ was methanized in the presence of a metallic Ni catalyst under a hydrogen flow. The light irradiated was measured for its incident light intensity every wavelength using a spectral emission photometer "USR-30V" available from Ushio Inc., and controlled such that an irradiation intensity thereof was 1.00 mW/cm$^2$. The product of an absorption rate (100−reflectance (%)) obtained from the diffuse reflectance spectra of the sample to be evaluated (FIG. 1) and an irradiation area (area of Petri dish: 5.51 cm$^2$) was calculated to determine the number of photons absorbed per unit time (number of absorbed photons). In addition, a $CO_2$ production rate (K value; μmol/h) was determined from a linear region of the $CO_2$ production by least square method, and a quantum efficiency QE thereof was calculated according to the following formula:

$$QE(\%) = 6 \times (CO_2 \text{ production rate})/(\text{number of absorbed photons}) \times 100.$$

Figure 2:
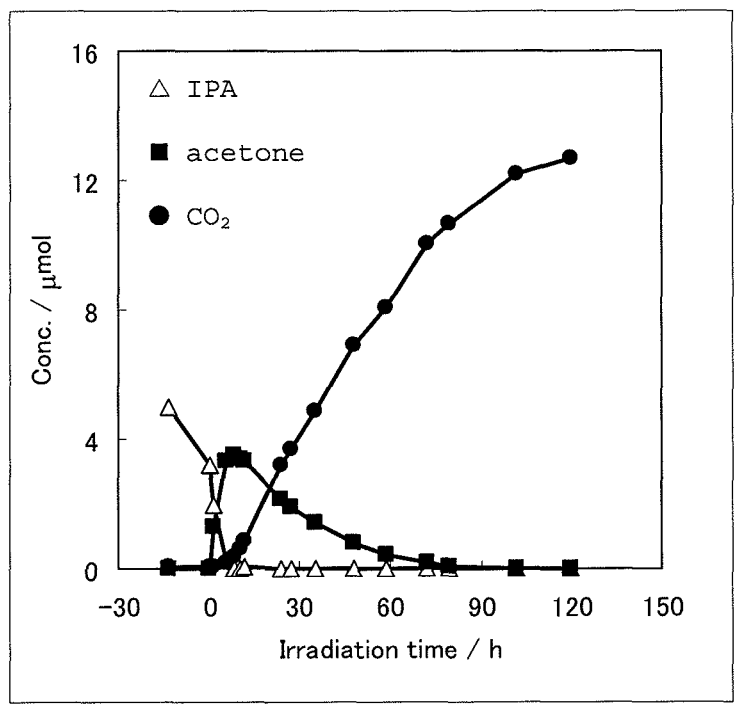
FIG. 2 is a view showing the results of oxidative decomposition reduction of isopropyl alcohol in Example 1.

The results of IPA decomposition confirmed by the above evaluation method are shown FIG. 2 and the below-mentioned Table 1. As recognized from Table 1, the photocatalytic material obtained in Example 1 exhibited a QE value as high as 5.6%. In addition, as recognized from FIG. 2, the photocatalytic material exhibited a large light absorption in a wavelength region of from 400 to 530 nm, and the K value indicating an actual photocatalytic activity was very high, i.e., 0.165 μmol/h.

Example 2

Synthesis of W/Ga-Codoped Titanium Oxide

The W solution and the Ga solution were prepared in the same manner as in Example 1.

Then, 1.5 g of titanium oxide (rutile type; available from Tayca Co., Ltd.) were suspended in 10 mL of ethanol. To the thus obtained suspension were added 3.17 mL of the Ga solution and 2.46 mL of the W solution, followed by stirring the suspension for 30 min. Thereafter, the obtained suspension was heated to evaporate the ethanol solvent therefrom, and the resulting solid was pulverized by an agate mortar to obtain a W/Ga-co-supporting titanium oxide powder. The powdered solid was calcined at 950° C. for 3 h to obtain a W/Ga-codoped titanium oxide powder. The composition of the thus obtained powder as calculated from the amounts of the raw materials charged was $W_{0.03}Ga_{0.06}Ti_{0.91}O_2$.

The copper divalent salt was supported on the thus obtained W/Ga-codoped titanium oxide, and the resulting material was subjected to evaluation of a photocatalytic performance thereof in the same manner as in Example 1. The results are shown in Table 1 below. As a result, it was confirmed that both the QE and K values were very high.

Comparative Example 1

The same procedure as in Example 1 was repeated except that the copper divalent salt was not supported on the W/Ga-codoped titanium oxide obtained in Example 1, and the resulting material was subjected to evaluation of a photocatalytic performance thereof in the same manner as in Example 1. The results are shown in Table 1 below. As a result, it was confirmed that both the QE and K values were very low.

Comparative Example 2

The copper divalent salt was supported on a rutile type titanium oxide (available from Tayca Co., Ltd.) by the same method as described in Example 1 to prepare a copper divalent salt-supporting titanium oxide. The thus obtained titanium oxide was subjected to evaluation of a photocatalytic performance thereof. The results are shown in Table 1 below. As a result, it was confirmed that although the QE value was comparatively high, light absorption in a wavelength range of from 400 to 530 nm was very small, and the K value was therefore low.

TABLE 1

|  | Example 1 | Example 2 | Comparative Example 1 | Comparative Example 2 |
| --- | --- | --- | --- | --- |
| Quantum efficiency QE | 5.6% | 13.5% | 0.02% | 5.6% |
| $CO_2$ production rate K | 0.165 μmol/h | 0.245 μmol/h | 0.001 μmol/h | 0.073 μmol/h |

The invention claimed is:

1. A photocatalytic material having a visible light activity, comprising a tungsten/gallium-codoped titanium oxide; and a divalent copper salt and/or a trivalent iron salt supported on a surface of the codoped titanium oxide.

2. The photocatalytic material according to claim 1, wherein a molar ratio of tungsten to titanium (W:Ti) in the tungsten/gallium-codoped titanium oxide is in the range of from 0.01:1 to 0.1:1, and a molar ratio of tungsten to gallium (W:Ga) in the tungsten/gallium-codoped titanium oxide is in the range of from 1:1.5 to 1:2.5.

3. The photocatalytic material according to claim 1, wherein the titanium oxide contains a crystal structure of a rutile type in an amount of 50% or more.

4. The photocatalytic material according to claim 1, wherein the titanium oxide contains a crystal structure of an anatase type in an amount of 50% or more.

5. The photocatalytic material according to claim 1, wherein the titanium oxide contains a crystal structure of a brookite type in an amount of 50% or more.

6. A process for producing the photocatalytic material as claimed in claim 1, successively comprising:
   a doping step: drying and solidifying a mixed solution containing a hexavalent tungsten salt, a tetravalent titanium salt and a trivalent gallium salt and then calcining the resulting dried solid at a temperature of from 600 to 1200° C. to obtain tungsten/gallium-codoped titanium oxide; and
   a metal salt supporting step: supporting a divalent copper salt and/or a trivalent iron salt on the codoped titanium oxide.

7. A process for producing the photocatalytic material as claimed in claim 1, successively comprising:
   a doping step: mixing an aqueous solution which contains a hexavalent tungsten salt and a trivalent gallium salt and is heated to a temperature of 60° C. or higher, with a solution containing a tetravalent titanium salt to obtain a tungsten/gallium-codoped titanium oxide; and
   a metal salt supporting step: supporting a divalent copper salt and/or a trivalent iron salt on the codoped titanium oxide.

8. The process according to claim 7, wherein the solution containing the tetravalent titanium salt is an aqueous solution of titanium tetrachloride.

9. A process for producing the photocatalytic material as claimed in claim 1, successively comprising:
   a doping step: mixing a gas containing a vapor of a volatile titanium compound, a vapor of a volatile tungsten compound and a vapor of a volatile gallium compound, with a gas containing an oxidative gas to obtain a tungsten/gallium-codoped titanium oxide; and
   a metal salt supporting step: supporting a divalent copper salt and/or a trivalent iron salt on the codoped titanium oxide.

10. The process according to claim 9, wherein the volatile titanium compound is titanium tetrachloride.

11. A process for producing the photocatalytic material as claimed in claim 1, successively comprising:
   a doping step: supporting both of a hexavalent tungsten salt and a trivalent gallium salt on a titanium oxide powder and then calcining the resulting material at a temperature of from 800 to 1000° C. to obtain a tungsten/gallium-codoped titanium oxide; and
   a metal salt supporting step: supporting a divalent copper salt and/or a trivalent iron salt on the codoped titanium oxide.

12. The process according to claim 6, wherein in the metal salt supporting step, the tungsten/gallium-codoped titanium oxide is contacted with an aqueous solution containing the divalent copper salt and/or the trivalent iron salt and the obtained mixture is heated to a temperature of from 85 to 100° C.

13. The process according to claim 7, wherein in the metal salt supporting step, the tungsten/gallium-codoped titanium oxide is contacted with an aqueous solution containing the divalent copper salt and/or the trivalent iron salt and the obtained mixture is heated to a temperature of from 85 to 100° C.

14. The process according to claim 9, wherein in the metal salt supporting step, the tungsten/gallium-codoped titanium oxide is contacted with an aqueous solution containing the divalent copper salt and/or the trivalent iron salt and the obtained mixture is heated to a temperature of from 85 to 100° C.

15. The process according to claim 11, wherein in the metal salt supporting step, the tungsten/gallium-codoped titanium oxide is contacted with an aqueous solution containing the divalent copper salt and/or the trivalent iron salt and the obtained mixture is heated to a temperature of from 85 to 100° C.

* * * * *